US012450220B2

(12) United States Patent
Garcia-Arellano et al.

(10) Patent No.: US 12,450,220 B2
(45) Date of Patent: Oct. 21, 2025

(54) STORING DATA PAGES OF A DATABASE IN A CLOUD OBJECT STORAGE

(71) Applicant: International Business Machines Corporation, Armonk, NY (US)

(72) Inventors: Christian Garcia-Arellano, Richmond Hill (CA); David Kalmuk, Markham (CA); Ronald J. Barber, San Jose, CA (US); Richard Sefton Sidle, Ottawa (CA); Hamdi Roumani, Toronto (CA); Alexander Cheung, North York (CA); Patrick R. Perez, Ajax (CA); Scott Douglas Walkty, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/666,938

(22) Filed: May 17, 2024

(65) Prior Publication Data

US 2025/0156392 A1 May 15, 2025

Related U.S. Application Data

(60) Provisional application No. 63/598,167, filed on Nov. 13, 2023.

(51) Int. Cl.
*G06F 16/22* (2019.01)
*G06F 16/28* (2019.01)

(52) U.S. Cl.
CPC ...... *G06F 16/2282* (2019.01); *G06F 16/2246* (2019.01); *G06F 16/285* (2019.01)

(58) Field of Classification Search
CPC ..... G06F 16/22; G06F 16/2282; G06F 16/285
USPC ............................................................ 707/802
See application file for complete search history.

(56) References Cited

U.S. PATENT DOCUMENTS

| 11,093,472 | B2 | 8/2021 | Spillane et al. | |
| 2023/0376476 | A1* | 11/2023 | Bhola | G06F 16/2246 |
| 2024/0020167 | A1* | 1/2024 | Ou | G06F 16/278 |
| 2024/0086362 | A1* | 3/2024 | Wang | G06F 16/1858 |

OTHER PUBLICATIONS

"Amazon Elastic Block Store," https://aws.amazon.com/ebs/, (Retrieved: Apr. 9, 2024), 9 pages.

(Continued)

*Primary Examiner* — Hung T Vy
(74) *Attorney, Agent, or Firm* — Cantor Colburn LLP; Teddi Maranzano

(57) ABSTRACT

Examples described herein provide a computer-implemented method for storing data pages of a database in a remote storage. The method includes receiving a write request associated with one or more data pages of the database. The method further includes storing, in a first storage layer having a write ahead log, the write request associated with the one or more data pages. The method further includes storing, in a first write buffer, the received write request associated with the one or more data pages that each include a legacy data page identifier. The method further includes storing, in a second storage layer having a second write buffer, a sorted string table (SST) of the received write request. The method further includes storing, in a top level of a log structured merge (LSM) tree disposed in the remote storage, the SST from the second write buffer.

18 Claims, 8 Drawing Sheets

(56) References Cited

OTHER PUBLICATIONS

"Block Storage capacity and performance," https://cloud.ibm.com/docs/vpc?topic=vpc-capacity-performance, (Retrieved: Apr. 9, 2024), 2023, 7 pages.
"IBM Cloud Block Storage," https://www.ibm.com/products/block-storage, (Retrieved: Apr. 9, 2024), 4 pages.
"IBM Cloud Object Storage," https://www.ibm.com/products/cloud-object-storage, (Retrieved: Apr. 9, 2024), 10 pages.
"IBM Db2 Warehouse," https://www.ibm.com/products/db2/warehouse, (Retrieved: Apr. 9, 2024), 18 pages.
"RocksDB: A persistent key-value store for flash and RAM storage", https://github.com/facebook/rocksdb, (Retrieved: Apr. 9, 2024), 4 pages.
"Amazon S3, Object storage built to retrieve any amount of data from anywhere", https://aws.amazon.com/s3/, (Retrieved: Apr. 9, 2024), 8 pages.
"Apache Iceberg", https://iceberg.apache.org, (Retrieved: Apr. 9, 2024), 2023, 8 pages.
"Apache Parquet-format", https://github.com/apache/parquet-format, (Retrieved: Apr. 9, 2024), 2023, 9 pages.
"Automatic Clustering", Snowflake, https://docs.snowflake.com/en/user-guide/tables-auto-reclustering, (Retrieved: Apr. 9, 2024), 1 page.
"Building real-time applications + analytics with SingleStore", https://www.singlestore.com, (Retrieved: Apr. 9, 2024), 10 pages.
"EmbeddedRocksDB Engine", https://clickhouse.com/docs/en/engines/table-engines/integrations/embedded-rocksdb, (Retrieved: Apr. 9, 2024), 4 pages.
"Extent sizes in table spaces", https://www.ibm.com/docs/en/db2/11.5?topic=data-extent-sizes-in-table-spaces, 2024, 2 pages.
"FoundationDB", http://github.com/apple/foundationdb, (Retrieved: Apr. 9, 2024), 7 pages.
"MemTable", http://github.com/facebook/rocksdb/wiki/memtable, (Retrieved: Apr. 9, 2024), 6 pages.
"Mirror of Apache Cassandra (incubating)", https://github.com/Instagram/cassandra/tree/rocks_3.0?utm_source=thenewstack&utm_medium=website&utm_content=inline-mention&utm_campaign=platform, (Retrieved: Apr. 5, 2024), 6 pages.
"MySQL HeatWave: Fully Managed Database Service", https://www.mysql.com/products/mysqlheatwave/fully-managed/, (Retrieved: Apr. 9, 2024), 3 pages.
"On Optimizing LSM-based Storage for Big Data Management Systems", Dissertation, University of California, Irvine, 2020, 201 pages.
"Open-sourcing a 10x reduction in Apache Cassandra tail latency", https://instagram-engineering.com/open-sourcing-a-10x-reduction-in-apache-cassandra-tail-latency-d64f86b43589, (Retrieved: Apr. 5, 2024), 18 pages.
"RocksDB-Cloud: A Key-Value Store for Cloud Applications", http://github.com/rockset/rocksdb-cloud, (Retrieved: Apr. 9, 2024), 5 pages.
"Strata 2019: Rockset—A data system for low-latency queries for search and analytics", https://www.youtube.com/watch?v=XsDXAecUlb4, 2019.
"TPC-DC: Decision Support Benchmark", https://www.tpc.org/tpcds/, (Retrieved: Apr. 9, 2024), 1 page.
"Use liquid clustering for Delta tables", Databricks, https://docs.databricks.com/en/delta/clustering.html, (Retrieved: Apr. 9, 2024), 2024, 8 pages.
"What is ArangoDB?", https://docs.arangodb.com/3.11/about-arangodb/, (Retrieved: Apr. 5, 2024), 5 pages.
Abebe, et al, "Proteus: Autonomous Adaptive Storage for Mixed Workloads", Association for Computing Machinery (ACM), 2022, 15 pages.
Ailamaki, et al, "Data Page Layouts for Relational Databases on Deep Memory Hierarchies", The VLDB Journal, 2002, 32 pages.
Armenatzoglou, et al, "Amazon Redshift Re-invented", Proceedings of the 2022 International Conference on Management of Data, 2022, 13 pages.
Canadi, "Converged Index™: The Secret Sauce Behind Rockset's Fast Queries", https://rockset.com/blog/converged-indexing-the-secret-sauce-behind-rocksets-fast-queries/, (Retrieved: Apr. 5, 2024), 2019, 10 pages.
Dageville, et al, "The Snowflake Elastic Data Warehouse", In Proceedings of the 2016 International Conference on Management of Data (SIGMOD), 2016, pp. 215-226.
Dhoot, "How We Use RocksDB at Rockset", https://rockset.com/blog/how-we-use-rocksdb-at-rockset/, (Retrieved: Apr. 9, 2024), 2019, 8 pages.
Dong, et al, Optimizing Space Amplification in RocksDB, 8th Biennial Conference on Innovative Data Systems Research (CIDR), 2017, 9 pages.
Fox, et al, Order-Preserving Minimal Perfect Hash Functions and Information Retrieval, ACM Transactions on Information Systems, vol. 9, No. 3, 1991, pp. 281-308.
Garcia-Arellano, et al, "Db2 Event Store: A Purpose-Built IoT Database Engine", Proc. VLDB Endow., vol. 13, No. 12, 2020, pp. 3299-3312.
Gupta, et al, "Amazon Redshift and the Case for Simpler Data Warehouses", In Proceedings of the 2015 ACM SIGMOD International Conference on Management of Data, 2015, 7 pages.
Kalmuk, et al, "Db2 Warehouse delivers 4x faster query performance than previously, while cutting storage costs by 34x", https://www.ibm.com/blog/db2-warehouse-delivers-4x-faster-query-performance-than-previously-while-cutting-storage-costs-by-34x/, 12pg.
Kalmuk, et al, "Native Cloud Object Storage in Db2 Warehouse: Implementing a Fast and Cost-Efficient Cloud Storage Architecture", ACM SIGMOD, 2024, 14 pages.
O'Neil, et al, "The Log-Structured Merge-Tree (LSM-Tree)", Acta Informatica, vol. 33, 1996, pp. 351-385.
Petrunia, "MyRocks in DB", https://mariadb.org/wp-content/uploads/2017/11/shenzhen2017-myrocks-in-mariadb.pdf, (Retrieved: Apr. 5, 2024), 21 pages.
Raman, et al, "DB2 with BLU Acceleration: So Much More than Just a Column Store", https://www.vldb.org/pvldb/vol6/p1080-barber.pdf, Proceedings of the VLDB Endowment, vol. 6, No. 11, pp. 1080-1091.
Saxena, et al, "Real-Time LSM-Trees for HTAP Workloads", arXiv preprint, 2022, 14 pages.
Stormacq, "AWS Glue Data Catalog now supports automatic compaction of Apache Iceberg tables", https://aws.amazon.com/blogs/aws/aws-glue-data-catalog-now-supports-automatic-compaction-of-apache-iceberg-tables/, (Retrieved: Apr. 9, 2024), 2023, 6 pages.
Taft, et al, "CockroachDB: The Resilient Geo-Distributed SQL Database", SIGMOD, 2020, 17 pages.
Xu, et al, "Building a Fast and Efficient LSM-tree Store by Integrating Local Storage with Cloud Storage", ACM Trans. Arch. Code Optim, 2022, 26 pages.
Zhao, et al, "Autumn: A Scalable Read Optimized LSM-tree based Key-Value Stores with Fast Point and Range Read Speed", arXiv preprint, 2023, 14 pages.

* cited by examiner

STORING DATA PAGES OF A DATABASE IN A CLOUD OBJECT STORAGE

BACKGROUND

The present disclosure generally relates to database storage, and more specifically, to embodiments for storing data pages of a database in a cloud object storage.

Database systems built for traditional storage subsystems usually store their data in small blocks referred to as data pages (commonly sized in a multiple of 4 KB for historic reasons, typically sized 4 KB, 8 KB, 16 KB or 32 KB). These traditional storage subsystems, for example block storage, were designed for efficient random-access patterns (write, update, delete and read) at the block level, and the block size is usually configurable by the application based on its needs. For more efficient access to data pages by database systems, the block size is configured to a small multiple of the data page size, as database systems traditionally rely on the random-access patterns to their data pages.

When moving the database system storage to Cloud Object Storage (COS), a key challenge is the different input/output I/O characteristics of COS compared to those of traditional file systems, like those built on top of block storage. These differences are both in terms of throughput and latency: COS is seen as a storage solution that is throughput optimized whereas block storage is a storage solution that is more balanced in terms of throughput and latency. In the case of throughput, assuming adequate server side resources for the COS implementation, the throughput limit for COS is imposed by the network bandwidth available to the compute nodes performing the I/O access and the parallelism utilized to maximize the use of that bandwidth, whereas in the case of block storage this limit is imposed by each device attached to the compute nodes, and throughput scalability is achieved by attaching more devices to each compute node (and also on the parallel access to each of those to maximize the throughput). Now in the case of latency, the COS is known to offer a significantly higher fixed latency per request when compared to block storage (~100-300 ms vs ~10-30 ms, 10× difference), resulting in the need to perform I/O operations in significantly larger block sizes (order of 10s of megabytes versus order of kilobytes used in block storage access) to better amortize the higher latency cost per operation.

SUMMARY

According to an embodiment, a computer-implemented method for storing data pages of a database in a remote storage is provided. The method includes receiving a write request associated with one or more data pages of the database. The method further includes storing, in a first storage layer having a write ahead log, the write request associated with the one or more data pages. The method further includes storing, in a first write buffer, the received write request associated with the one or more data pages that each include a legacy data page identifier. The method further includes storing, in a second storage layer having a second write buffer, a sorted string table (SST) of the received write request. The method further includes storing, in a top level of a log structured merge (LSM) tree disposed in the remote storage, the SST from the second write buffer.

According to another embodiment, a system is provided. The system includes a memory having computer readable instructions and a processing device for executing the computer readable instructions, the computer readable instructions controlling the processing device to perform operations for storing data pages of a database in a remote storage. The operations include receiving a write request associated with one or more data pages of the database. The operations further include storing, in a first storage layer having a write ahead log, the write request associated with the one or more data pages. The operations further include storing, in a first write buffer, the received write request associated with the one or more data pages that each include a legacy data page identifier. The operations further include storing, in a second storage layer having a second write buffer, a sorted string table (SST) of the received write request. The operations further include storing, in a top level of a log structured merge (LSM) tree disposed in the remote storage, the SST from the second write buffer.

According to another embodiment, a computer-implemented method for performing data clustering for storing data pages of a database in a remote storage is provided. The method includes receiving a read request or a write request for the data pages of the database. The method further includes generating a clustering key that is used within a first log structured merge (LSM) tree disposed in the remote storage, the LSM tree having multiple levels of sorted string tables. The method further includes generating a mapping index that contains a mapping of a table space relative page identifier to the clustering key and related attributes, wherein the mapping index is persisted in a second LSM tree for the table space separate from the first LSM tree. The method further includes determining an organizational structure of data stored in the data pages. The method further includes clustering, based on the determined organizational structure of data stored in the data pages, the data using the clustering key and the mapping index.

According to another embodiment, a computer-implemented method for retrieving data pages of a database in a remote storage is provided. The method includes receiving a read request for a date page of the database. The method further includes searching a log structured merge (LSM) tree disposed in the remote storage for a sorted string table (SST) file associated with the data page of the read request. The method further includes, responsive to locating the SST file associated with the data page of the read request, storing the SST in a local cache. The method further includes receiving a subsequent read request for the data page of the database. The method further includes retrieving the SST file associated with the data page of the read request from the local cache without searching the LSM tree.

According to another embodiment, a system for storing data pages of a database in a cloud object storage is provided. According to an aspect, a computer-implemented method includes an application programing interface configured to receive read and write requests from the database, the read and write requests corresponding to one or more data pages, a first storage layer having a write ahead log that is configured to store received write requests associated with one or more sequential data pages and to associate a clustering key with the one or more sequential data pages, and a first write buffer that is configured to store received write requests associated with one or more non-sequential data pages that each include a legacy data page identifier. The system also includes a second storage layer having a second write buffer that is configured to receive flushed write requests from the first write buffer, sort the write requests based on the legacy data page identifier associated with the write requests, and create a sorted string table (SST) of the write requests, a log structured merge (LSM) tree disposed in the cloud object storage, the LSM tree having multiple levels of sorted string tables, wherein a top level of the LSM tree stores SSTs received from the second write buffer, and wherein each level of the LSM tree includes SSTs that are formed by combining SSTs on an adjacent higher level, such that SSTs of the non-top layer of the LSM includes non-overlapping ranges of legacy data page identifiers, and a mapping table of legacy data page identifiers to clustering keys that is stored in the LSM tree.

Other embodiments described herein implement features of the above-described method in computer systems and computer program products.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
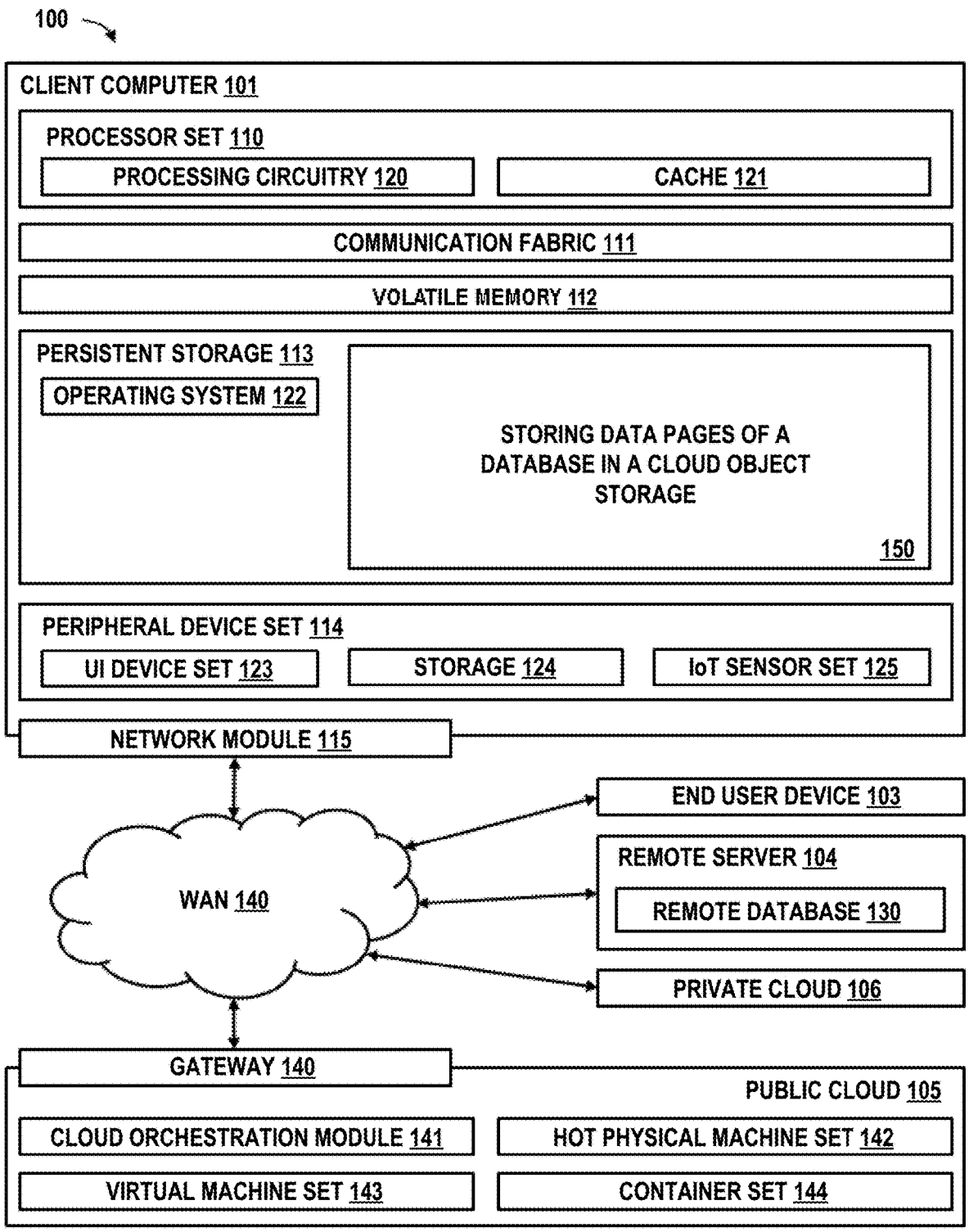
FIG. 1 depicts a block diagram of an example computer system for use in conjunction with one or more embodiments of the present disclosure.

One or more embodiments described herein provide for storing data pages of a database in a cloud object storage (COS). It can be challenging to store data pages of a database in a COS because of differences in latency and throughput between block storage and COS.

A naive implementation of the existing storage access layer of a database system, that is optimized for block storage, to target COS is likely to result in very poor performance due to the performance differences outlined above. One possible approach to improve over that would be to modify the data page container sizes to accommodate the larger object sizes that are ideal for COS. For example, in a Db2 database, data pages are organized in a logical block size of contiguous data pages named extents, which have a size that is user configurable and could be used as the object size to store in object store. This is an approach that has been used before to optimize the data organization, like in Db2 BLU, where extents are assigned pages of a single column group to improve data locality and maximize read performance. With this approach, each "extent" would be stored in COS as an independent object, and would maintain the same data locality characteristics, and likely the same read performance. However, there are several challenges with this approach. First, the significantly larger block size used for COS results in the need to extend the size of these "extents" significantly, resulting in additional challenges to maintain data locality for a variety of ingest patters. For example, in Db2, this would result in the need to enlarge "extents" from the current size of 128 KB to 32 MB, that is, move from storing four 32 KB data pages per extent to storing substantially one thousand 32 KB data pages per extent. Moreover, poor data locality would likely result in significant read amplification and poor read and cache performance. This may be a feasible approach for very large bulk operations that populate very large number of data pages at once, but for other ingest patterns with less volume, this approach would result in either very small extents or the need to continuously re-write them until they reach the desired maximum size (increasing write amplification), in order to achieve optimal read performance and data locality. In addition, for non-columnar data commonly utilized by database systems, like row-organized tables, or B+trees, the traditional space management organization of data pages used for block storage would result in pseudo-randomly assigning pages within very large blocks of substantially one thousand pages, which would result in poor read performance due to the significant read amplification it would generate. In addition, the continuous update patterns of data pages would result in the need to synchronously re-write these same blocks of data in the order of megabytes, resulting in also a very significant write amplification and resulting performance penalty. This could also result in the same ill effects for column-organized data, as data is eventually deleted, and the reorganization of "extent" contents resulting from the space management resulting from the deletion of data would also result in significant write amplification.

An alternative approach to adopting COS within a database system is what has been adopted by open source data formats like Apache Parquet and Snowflake's own proprietary data format. This approach creates a custom storage organization using a data format derived from the PAX format. This approach is suited for COS, as the format is designed to scale the object size to large sizes, to the order of megabytes, and maintain a lot of the advantages of the existing page organizations. The disadvantage to this approach is that this format was not developed with the goal of efficient maintenance when data is eventually modified, or even when the initial formation of these large blocks is impossible, for example, like in the presence of trickle feed ingest patterns. This results in costly additional mechanisms that need to be developed to address these limitations, like the ones developed for Db2 Event Store, where there is not only an ingest pipeline ahead of the formation of initial PAX format objects (Apache Parquet) to store in COS to increase the initial size of these objects to better amortize the large latency, but also a continuous optimization pipeline that takes care of the compaction of blocks into larger blocks for more efficient query processing.

One problem is how to best store the data pages within object storage while minimizing these amplification factors, write, read, and storage, and as a result achieve higher performance both for ingest-update-delete operations (IUD) and queries. In the case of a traditional database system (e.g., a Db2 system), with decades of development, the desire to store the data pages without modification comes from the need to maintain much of the existing behavior and optimizations built on top of the contents of these data pages, and it is also motivated in the significant engineering cost of re-architecting the database system that has been developed over decades.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as storing data pages of a database in a cloud object storage (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economics of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

There are a variety of page organizations within database systems, and most implement a multitude of these, and even combinations of these. Note that in the description below, embodiments are described regarding organizing the data in chunks referred to as data pages, which could be of a fixed size or variable size. Most database vendors that were designed for traditional storage subsystems have this concept, usually with fixed page sizes between 4 KB and 32 KB, although other sizes are possible. Data can be organized within database systems various ways, including column organized data, row organized data clustered organized data, large objects data, tree structures, and/or the like, including combinations and/or multiples thereof.

Column Organized Data—Tables that are column organized usually have a two-level hierarchy: columns are usually grouped together in column groups with one or more columns each. Data pages are assigned to a column group. Rows for columns within a column group are stored together within data pages, and this could be in column major order, or row major order. Data pages belonging to a column group are usually stored contiguously on disk to enable sequential reading when the storage medium provides performance benefits. Column organized data are usually more costly (in terms of latency) to ingest and update in small volumes because the data for a single row is spread across multiple data pages. Column organization is usually used in analytics environments, where the access paths can be optimized not only to read the subset of data queries, but also implement other optimizations that benefit from the values of a single column being stored contiguously, like for example vectorized processing, or compression algorithms.

Row Organized Data—Tables that are column organized assign rows to pages, and the complete row is stored within a minimum number of pages that fit them. Row organization is more common in operational environments, where there is a need for more efficient data manipulation language (DML) operations on random rows, even in small volumes.

Clustered Organized Data—Clustered organized data refers to a data organization where rows are assigned to data pages based on a clustering attribute of the data (for example a user provided clustering key). This data organization could be strict or lazy. When lazy clustering is implemented, data pages may have overlapping ranges with respect of the clustering key. In such situations, a continuous reorganization of the data may be performed to improve the clustering ratio.

Large Objects (LOB) Data—Large objects refer to data that spans more than one data page. One possible organization of these objects is to divide them in data page size chunks, that allow the independent update and query of portions of the large object. Another possible organization is to store the objects as a unit in a storage medium that allows it.

Tree Data, like B+Tree—Tree structures are organized in nodes that contain data and references to other nodes of the tree. It is common for these nodes to be contained within a data page. Some tree structures, like the B+Tree, perform rebalance operations during insert-update-delete operations to maintain the properties of the tree, which could result in the update of multiple data pages.

In one or more embodiments, a design of a storage engine that enables the storage of data pages from a traditional database system with an LSM tree organization is provided. The LSM tree is stored in cloud object storage as the permanent persistent layer for the data pages. Data pages contain a multitude of rows within them and are usually sized in the range of 4 KB to 32 KB, although other sizes are possible. Data pages are written and read through the new storage engine write and read application program interfaces (APIs) using the legacy data page identifier (key) to maintain existing behaviors in higher levels of the database engine, replacing the existing write and read operations over traditional storage subsystems (for example, portable operating system interface (POSIX) file system APIs). One or more embodiments described herein provides for the write API to support the ability to provide one (or more) additional clustering key(s) for the data pages that are exploited to allow the storage engine to achieve optimized data organization, and the read APIs support the ability to read pages using the key or any of the clustering keys. Internally, the storage engine uses the clustering keys for the storage of the data pages within the LSM tree to enable efficient read access when loading from cloud object storage, and an efficient cache utilization. That is, the clustering key is used for sorting the data pages within the LSM tree, and the legacy data page identifier becomes a secondary attribute. This storage organization based on the clustering keys may be implemented either synchronously during write or asynchronously, and one or more embodiments described herein provides a mechanism to track outstanding asynchronous writes within an LSM tree. When the application is able to provide pre-clustered list of pages using the clustering key, this disclosure discusses an optimization to the write path that benefits from this and reduce write amplification. The mapping of data page keys to clustering keys are stored in a persistent mapping table at the data page granularity, which has significant lower overhead than indexing solutions that are maintained at the row granularity.

The LSM tree is a data structure that was designed for write performance through the ingestion into partially sorted files in the top level of the tree (usually called Sorted String Table (SST) files) for high ingest throughput, and then the data propagates through a batch process into lower levels of the tree. As a result the LSM tree can perform continuous optimizations through compactions that re-organize the data in the SST files into fully sorted levels of configurable sizes, which can easily accommodate the optimal size desired for storage in COS. The adoption of LSM tree organization has been a common pattern in many database products as a result of the popularity of the RocksDB open source embeddable database engine. Many adoptions of RocksDB as a storage engine have integrated LSM tree organization into the database engine through the encoding of rows as key-values that are stored directly into RocksDB. Some examples of this includes MariaDB, Cassandra, Clickhouse, UStore, ArangoDB, and Rockset. In the case of Rockset, it is the only one that has specifically targeted the storage of the LSM tree in COS.

Figure 2:
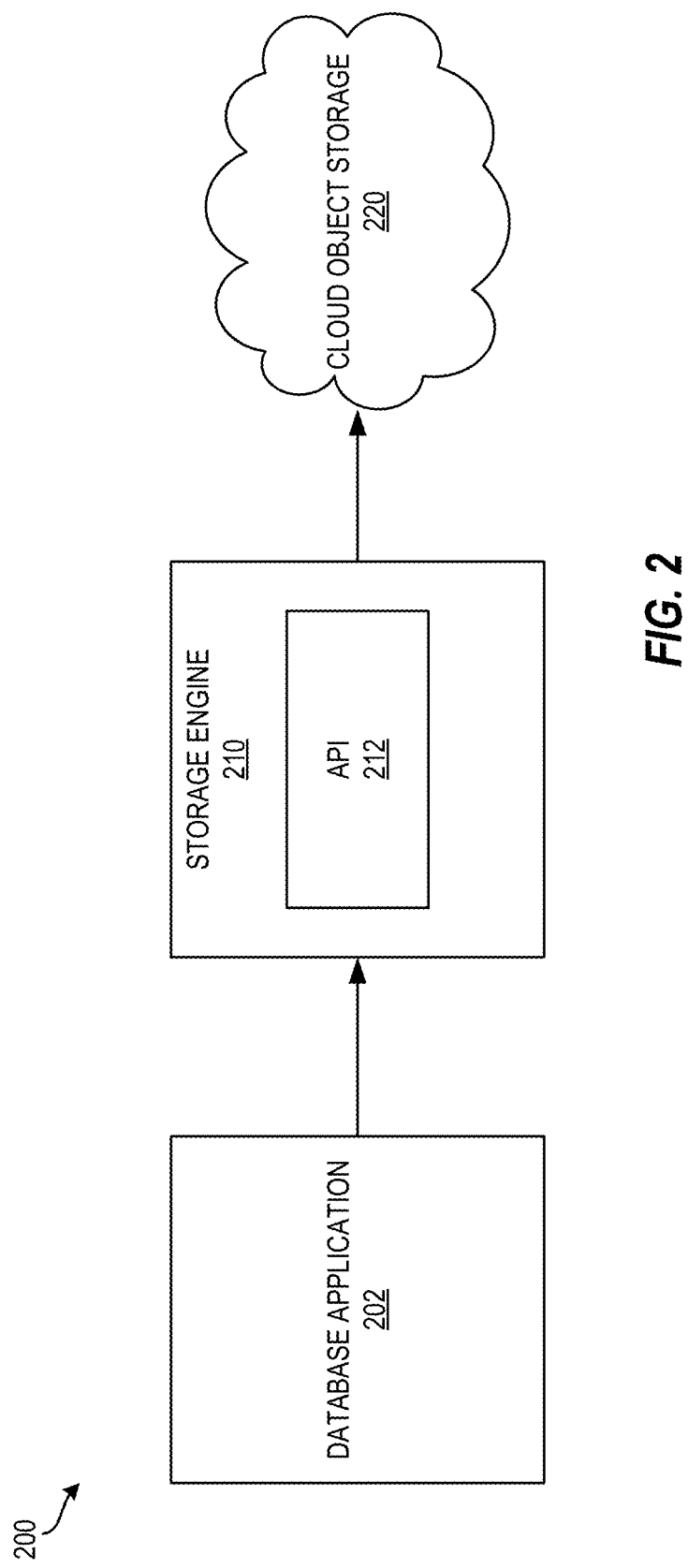
FIG. 2 depicts a block diagram of a system for storing data pages of a database in a cloud object storage according to one or more embodiments described herein.

FIG. 2 depicts a block diagram of a system 200 for storing data pages of a database in a cloud object storage in accordance with one or more embodiments of the present disclosure. The system 200 includes a database application 202, a storage engine 210, and a cloud object storage 220. The cloud object storage 220 is an example of a remote storage with relatively high latency per operation, and it should be appreciated that the one or more embodiments described herein can be applied to any remote storage with relatively high latency per operation. The database application 202 stores data pages. The storage engine 210 includes an API 212, which may be a read API and/or a write API. According to one or more embodiments, the storage engine 210 includes a read API and a write API. Data pages are written and read through the storage engine 210 using the API 212 (e.g., a write API and/or a read API respectively) using a legacy data page identifier (key) to maintain existing behaviors in higher levels of the database application 202. This architecture replaces the existing write and read operations over traditional storage subsystems (for example, POSIX file system APIs).

The write API supports the ability to provide one (or more) additional clustering key/s for the data pages that are exploited to allow the storage engine 210 to achieve optimized data organization, and the read API supports the ability to read pages using the key or any of the clustering keys. Internally, the storage engine 210 uses the clustering keys for the storage of the data pages within an LSM tree to enable efficient read access when loading from the cloud object storage 220, and an efficient cache utilization. This storage organization based on the clustering keys may be implemented either synchronously during write or asynchronously, and one or more embodiments provides a mechanism to track outstanding asynchronous writes within an LSM tree. When the database application 202 is able to provide a pre-clustered list of pages using the clustering key, one or more embodiments provides an optimization to the write path that benefits from this and reduce write amplification. The mapping of data page keys to clustering keys are stored in a persistent mapping table at the data page granularity, which has significant lower overhead than indexing solutions that are maintained at the row granularity. These and other features are now described in more detail with reference to FIGS. 3A-5.

Figure 3A:
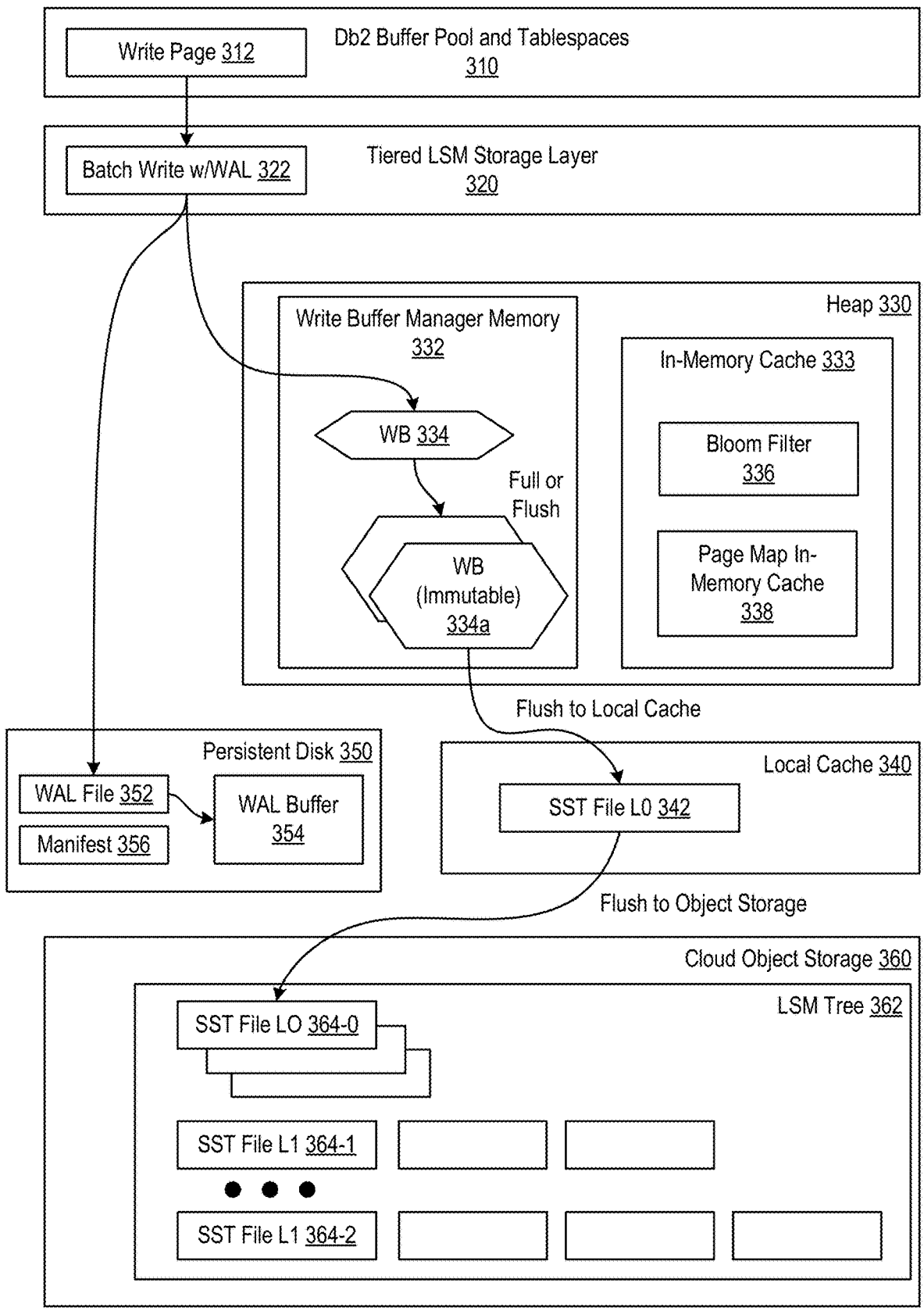
FIG. 3A depicts the operation of a storage engine according to one or more embodiments described herein.

FIG. 3A illustrates a design of a storage engine that enables the storage of data pages from a traditional database system in object storage. Data pages are written and read using the API 212 of the storage engine 210 of FIG. 2.

The storage engine 210 provides for storing page data to the cloud object storage 220 is built on top of an LSM tree implementation (for example, RocksDB) with the following characteristics: three storage layers that are exploited for different purposes; local storage on a traditional storage subsystem that implements replication for device failure toleration; local storage on a traditional storage subsystem that is considered ephemeral because it does not implement replication and does not provide device failure toleration, but provides high performance; and cloud object storage with failure toleration.

With reference to FIG. 3A, a Db2 buffer pool and tablespaces 310 of the database application 202 initiates a write page 312, which is sent to a tiered LSM storage layer 320. The tiered LSM storage layer 320 generates a write batch with a Write-Ahead-Log (WAL) 322, which is discussed in more detail herein. The write batch with WAL 322 is sent to a heap 330 and a persistent disk 350. The heap 330 is a table without a clustered index. The heap includes a write buffer manager memory 332 and an in-memory cache 333. The write buffer manager memory 332 receives the batch write with WAL 322 and stores the page data into one or more write buffers (WB) 334. When a write buffer is full or a flush is performed, for example, a write buffer is written to an immutable write buffer 334a. When a flush to local cache is performed, the immutable write buffer 334a sends the page data to an SST file L0 342 of local cache 340. The SST files of the local cache 340 contain application data and constitute the bulk of storage requirements used by the LSM tree 362. The write buffers 334 allow the IUD of unordered keys and are persisted asynchronously to cloud object storage 360. These write buffers 334 may be temporarily written to ephemeral local storage (a traditional storage subsystem) before they are written to cloud object storage 360 for durability according to one or more embodiments. A write buffer 334 is sorted using the key before it is written to cloud object storage 360 and added to the top level (level 0) of the LSM tree 362 in the form of an SST file (e.g., SST File L0 364-0). It should be appreciated that the LSM tree 362 includes multiple layers (e.g., layer 0 (L0), layer 1 (L1), . . . layer N (LN)), with each layer having respective SST files (e.g., SST file L0 364-0, SST file L1 364-1, . . . . SST file LN 364-N). The multiple SST files in the top level (level 0) of the tree contain key ranges that may be overlapping.

According to one or more embodiments, a Write-Ahead-Log (WAL) allows the immediate persistence of data. The WAL write path includes writing the data pages as WAL file 352 in a WAL buffer 354 of persistent disk 350, and subsequently the writing of that WAL buffer 354 to storage in a WAL flush operation. This WAL persistence can be to local persistent storage (a traditional storage subsystem) or in object storage, the two storage elements that provide device failure toleration.

The persistent disk 350 also stores a manifest 356. The manifest 356 stores metadata indicating the current state of the database.

In exemplary embodiment, the cloud object storage 360 includes a background process that performs LSM compaction from objects in level Li of the LSM tree to level Li+1. The SST files within a level of the LSM tree contain non-overlapping key ranges, other than those in the first level.

According to one or more embodiments, the storage engine 210 includes the local cache 340 in ephemeral local storage (a traditional storage subsystem) for caching SST files (e.g., SST file L0 342) from any level of the LSM tree 362. There are several additional elements in the write APIs of the storage engine 210 for cloud object storage 220 when compared with write APIs of traditional storage subsystems.

According to an embodiment, the storage engine 210 supports the ability to write batches of multiple operations (Insert, Update, Delete) that take effect atomically. According to an embodiment, the storage engine 210 supports providing one (or more) additional clustering key/s for the data pages that can be exploited to allow the storage engine to achieve optimized data organization and access paths (See Clustering section below). According to an embodiment, the storage engine support the ability to execute write batch operations asynchronously and track their persistence using an application provided sequence number as described herein. According one or more embodiments, the storage engine support the ability to control the persistence of synchronous writes through a WAL in local persistent storage (a traditional storage subsystem): this results in the data being written twice, once to the WAL buffer 354 and once to cloud object storage 360, but with the advantage of the WAL writes being sequential writes to a traditional storage subsystem, which will exploit the main advantages of this storage, and then eventually to cloud object storage 360, which allows the optimization of the block size used, which amortizes the increased latency.

Figure 3B:
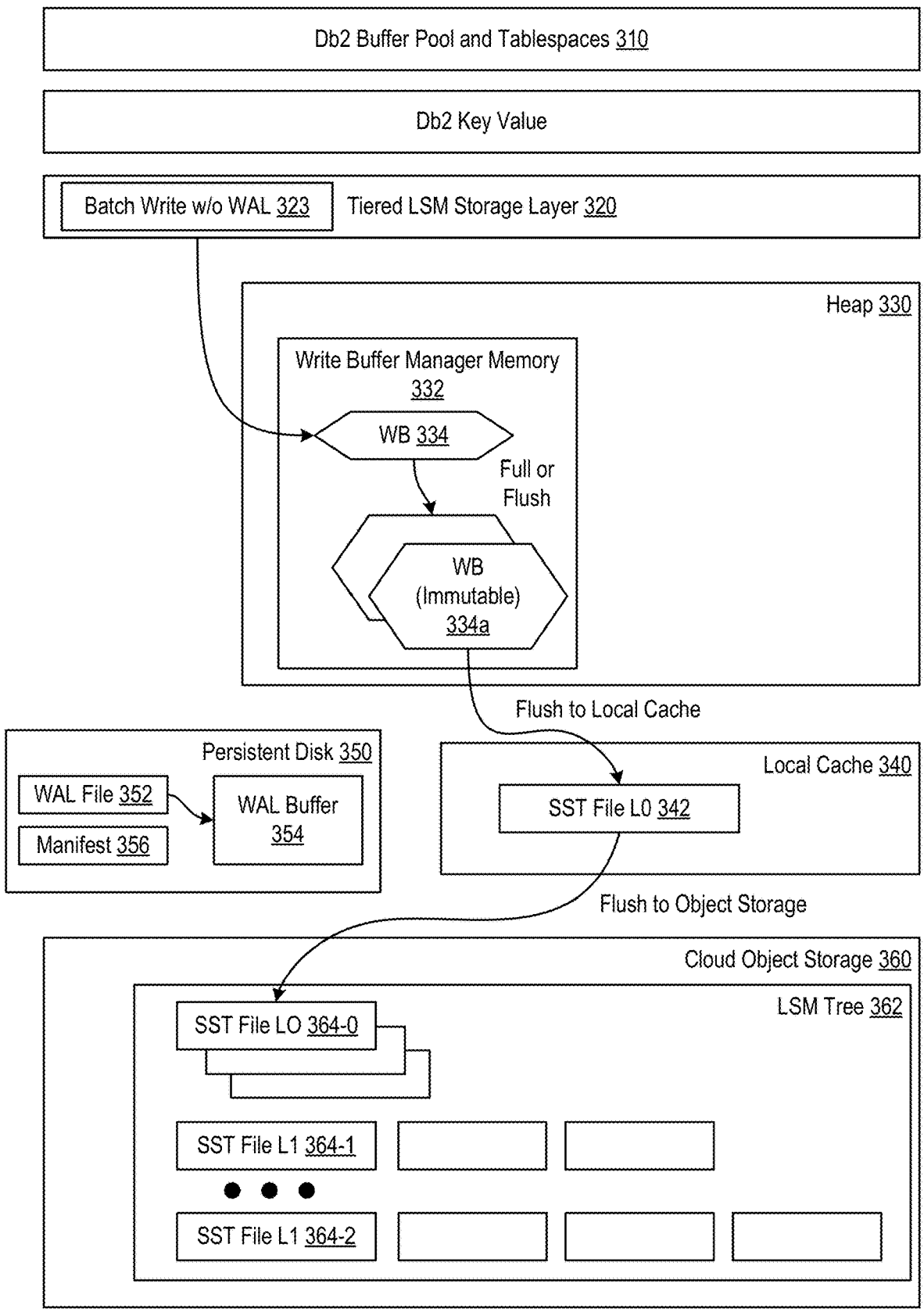
FIG. 3B depicts the ingest path that does not leverage the WAL and that uses write tracking to identify the completion of the write operation to cloud object storage according to one or more embodiments described herein.

According to one or more embodiments, the storage engine 210 supports the ability to control the persistence of synchronous writes directly to object storage, skipping the WAL, as shown in FIG. 3B. This approach can be utilized by batch operations that do not require persistence guarantees because the caller already implements its own persistence guarantees or recoverability guarantees.

Figure 3C:
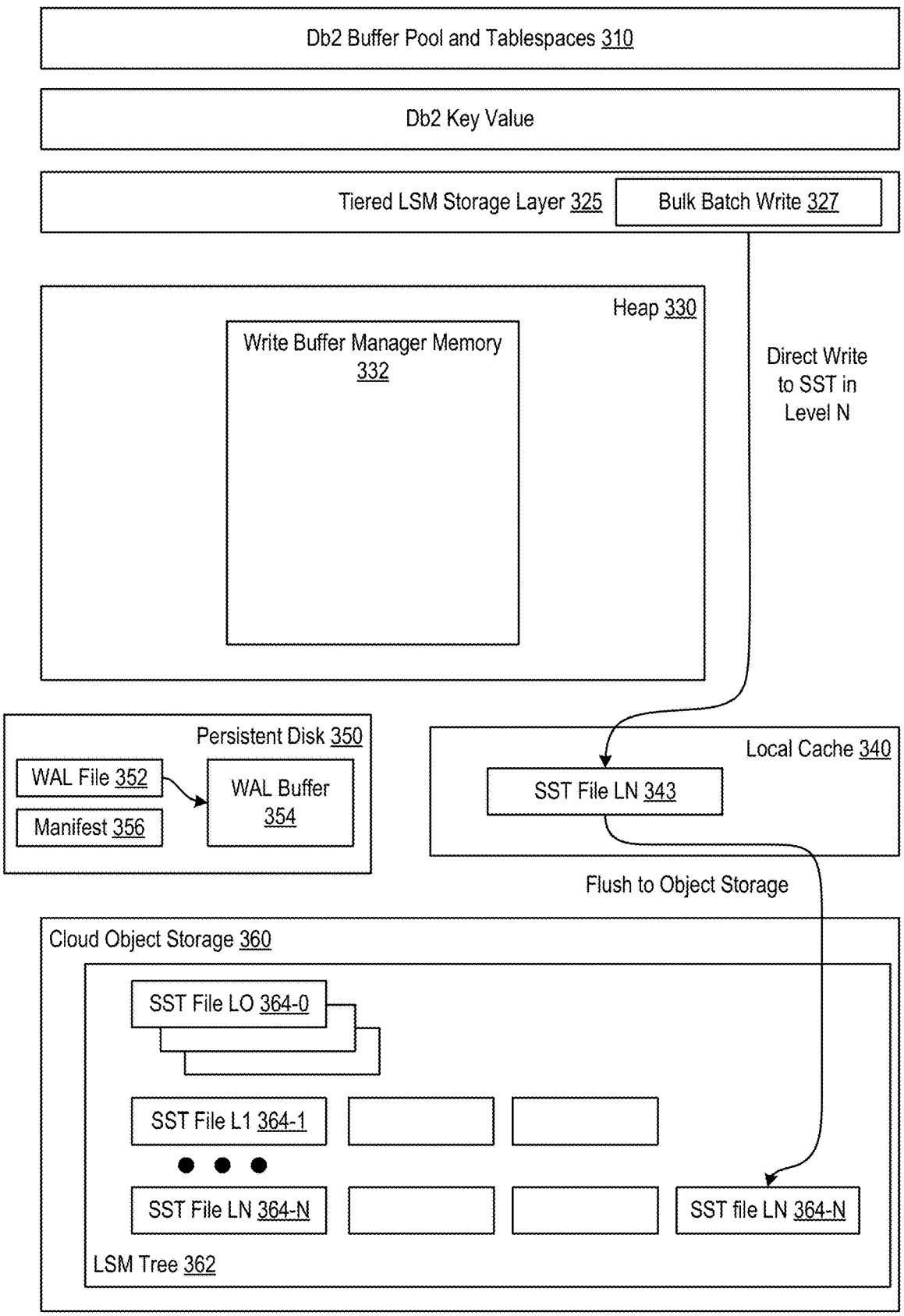
FIG. 3C depicts the direct write path implemented by the storage engine according to one or more embodiments described herein.

According to one or more embodiments, the storage engine 210 supports the ability to control the persistence of synchronous writes support the ability to perform additional write optimizations within a batch that includes exclusively data page insert operations when the caller provides ordering guarantees over the clustering key as shown in FIG. 3C and as described further herein (See Write Optimization For Ordered Batches section below).

It should be appreciated that the embodiment of FIG. 3A-3C provides for distributing the sorted string table, the manifest, and the WAL across multiple storage tiers, including a remote storage tier represented by the cloud object storage 360, a local persistent storage tier (low latency) represented by persistent disk 350, and a local caching tier (ultra-low latency) represented by local cache 340.

For the remote storage tier, object storage provides the foundation to achieving one of the primary objectives of reducing the cost of storing large volumes of data, and for that reason, it is used as the persistent storage layer for SST files.

The local persistent storage tier provides block storage that is used for storing data that is very sensitive to latency, including the write-ahead-log and metadata files. This enables KeyFile to support low latency write patterns while benefiting from the durability provided by block storage infrastructure provided in the cloud object storage 360.

The local caching tier is used to cache a subset of frequently accessed SST files, a functionality that was inherited from RocksDB-Cloud, but that was extended to satisfy KeyFile's requirements. This is stored in locally attached NVMe drives in order to mitigate the high latency involved with repeated object storage access. The SST cache can be combined with database storage paths residing on physically attached instance storage. This tier is considered volatile storage and is used both for transient staging during IUD, and as a cache for reads.

Clustering

Some database structures rely on the ability to address pages through a relative page number that denotes the page location within its containing table space. Even though this identifier could be directly used for page identification within an LSM tree data structure, the opportunity to exploit the natural clustering abilities of the LSM tree may be lost. For this reason, an additional clustering key is now introduced that is used within the LSM tree 362 for the organization of the data pages that can be exploited differently depending on the access patterns of each page type in the database application 202. In some cases (e.g., Db2), since the database application 202 table space relative page identifier was still needed, as the majority of the Db2 engine uses this identifier and needed to be preserved to minimize the amount of change, a mapping index (also referred to as a "mapping table") is now introduced. The mapping index contains mapping of the legacy data page identifier (key) to the clustering key and the storage of the additional attributes. For example, the mapping index contains the mapping of the Db2 table space relative page identifier to the clustering key and the storage of related attributes. This mapping index is an LSM tree persisted in a special KeyFile domain for each Db2 table space. The data pages themselves are stored separately in one or more KeyFile domains using the clustering keys. This clustering key is then exploited to optimize in different ways depending on the data page type.

According to one or more embodiments described herein, one or more LSM trees are also used for the storage of data pages using the clustering key. The data is organized within the LSM tree (e.g., the LSM tree 362) following the order defined by the clustering key. In exemplary embodiments, there are various schemes that can be used to define the clustering key in order to achieve different goals.

For column organized data pages: column organized data pages contain a column group identifier (CGI), a column identifier (CI) and a base row identifier (RI) as part of the attributes. The base row identifier is a representative row identifier for the rows contained within the data page, for example, the first or last row identifier in row identifier order. PAX like organization: RI+CGI+CI or RI+CI. This results in higher ingest performance, but significantly lower query performance and poor cache utilization. Column group organization: CGI+CI+RI. This results in lower ingest performance than PAX, but significantly better query performance and better cache utilization. Column organization: CI+RI. Even lower ingest performance than column group organization, and better query performance due to the better cache utilization.

For row organized data pages: row organized pages contain a legacy page identifier (usually an offset), a row identifier, and a primary key or order preserving hash of the primary key (if provided). Legacy Page identifier organization: this includes a logical clustering into "Extents" that would maintain the same on disk organization as in traditional storage, and can provide benefits based on this ordering for existing pre-fetching algorithms. Row identifier organization: when row organized pages also follow an append-only (or append-mostly) insert scheme like the one most commonly used in column-organized tables, where updates are decomposed into deletes+inserts, then it is possible to use a similar clustering as with column organized data pages using the row identifier as a component of the clustering key. This would create an insertion time ordered clustering of data pages, which is beneficial for many analytics use cases that use insertion time attributes as part of the queries.

For B+tree index pages: B+tree index pages contain a tree level, a key of one of the entries within the tree page (e.g., the first one added to the tree page), order preserving hash of a key of one of the entries within the tree page (e.g., the first one added to the tree page). The use of the tree level as the high order component of the clustering key allows the data pages belonging to the top of the tree to be clustered together, and with this provide fast access to the key components of the tree. The use of the key or a hash preserving key as a low order element of the clustering key benefits index scans in key order.

For large objects (LOB) data: LOB data as discussed is usually split into evenly sized blocks, usually page sized. The block identifier can be used as a clustering key to provide access to these LOB objects where access to all components can be achieved.

For clustered data pages: data pages that are from tables that already support the ability to cluster could maintain this clustering by using the existing clustering key.

The clustering key could change over time in order to adapt to access patterns for a range of data pages. A data page can be stored multiple times with different page organizations using the multiple clustering keys in order to serve a variety of access patterns that produce performance benefits from each at once.

Write Tracking

The write API (e.g., the API 212) supports the ability to execute write batch operations asynchronously. These asynchronous write operations allow the caller to provide a monotonically increasing write tracking sequence number that can be used to identify the completion of the persistence for the asynchronous write operation. For this, the storage engine 210 for COS provides a different API to return the minimum write tracking sequence number that has not been persisted.

Internally, the keys stored in the LSM tree include the write tracking sequence number as an attribute or suffix to the clustering key used to store the data pages. The writing of these data pages, when using the normal write path through the WAL (e.g., the WAL file 352 stored in the WAL buffer 354), ensures the immediate persistence in the WAL, and the asynchronous persistence to cloud object storage 360 through the write buffers (e.g., the write buffer 334) that when written produce SST files in level 0 of the LSM tree (e.g., the SST file L0 342, where "L0" designates the level as being "level 0"). When using the write path skipping, the WAL persistence to cloud object storage 360 is exclusively asynchronous through the write buffers that when written produce SST files in level 0 of the LSM tree. The write tracking sequence number embedded in the keys or key attributes is used to identify the minimum write tracking sequence number across data pages included in a write buffer, which becomes the minimum write tracking sequence number for the write buffer. When the API to return the minimum write tracking sequence number that has not been persisted is invoked, the storage engine 210 collects the minimum write tracking sequence number across all unwritten write buffers. Once a write buffer is persisted, the write tracking sequence number is dropped from the keys in the persistence layer, as it is not needed anymore.

FIG. 3B illustrates the ingest path that does not leverage the WAL and that uses write tracking to identify the completion of the write operation to cloud object storage 360. In this example, a batch write without WAL 323 is written to the write buffer 334. When using the normal write path through the WAL, the caller can optionally define that the write tracking sequence number be used to identify the persistence to the WAL (e.g., the WAL file 352 stored in the WAL buffer 354), rather than to cloud object storage 360. When this option is chosen, the write tracking sequence number embedded in the keys or key attributes is only used to track persistence of the WAL buffers to the WAL and not to persistence of the write buffers to the level 0 of the LSM tree. In that case, when the API to return the minimum write tracking sequence number that has not been persisted is invoked, the storage subsystem collects the minimum write tracking sequence number across all unwritten WAL buffers.

Write Optimization for Ordered Batches

Write batches originating from bulk load operations usually containing large volume of new data pages can benefit from an optimization to perform pre-clustering of the data pages using the clustering keys and to ingest the set of new data pages directly into the lower level of the LSM tree, bypassing the pre-sorting and compaction overhead incurred through the ingestion through the level 0 of the LSM tree. This approach is illustrated in FIG. 3C. In this example, a tiered LSM storage layer 325 sends a bulk batch write 327, which bypasses the write buffers of the heap 330. That is, the bulk batch write 327 is performed to directly write to the SST in level N (e.g., the lowest level) of the LSM tree 362 of the cloud object storage 360. In this example, the SST file is SST file LN 364-N. The complete set of insert operations within a batch must satisfy two conditions to be able to use this optimization: 1) contain clustering keys that are monotonically increasing within a batch, and 2) clustering keys are non-overlapping with any other previously ingested data and any other concurrent ingest operations.

When the storage engine is able to create multiple lists of pre-ordered data pages that satisfy the conditions for this optimization, and these lists contain data pages with clustering keys that are not overlapping with each other, a multitude of concurrent write batches that benefit from this optimization can be created to achieve greater performance due to the parallelism. FIG. 3C illustrates the direct write path implemented by the storage engine 210.

Out of Band Page Writes while Exploiting Write Optimization for Ordered Batches

Database systems can benefit from the write optimization for ordered batches described above because the majority of writes of new data pages in bulk load operations follow an append only approach. There are however cases in which the data write page pattern is not fully append only, for example when a data page that is part of a write batch using the optimization is re-written before this write batch is completed (e.g. a tail page). In that case, the new data page write would not satisfy the conditions for using the optimization and would need to be written through the normal write path through the write buffers. There are two consequences of this: 1) in order to provide the correct write ordering, the new page write is initiated after the write batch containing the previous version of the page is complete and part of the LSM tree, and 2) subsequent write batches that intend to use the same write batch optimization may not be able because they will break one of the conditions, as the second write through the normal write path using the write buffer may result in a wide range of overlaps, that would prevent the future use of the optimization until those writes have gone through a compaction process in the LSM tree.

In order to overcome this limitation, one or more embodiments described herein provides uses a Logical Range ID as a prefix of the clustering key when forming the key to use to store the data pages within the LSM tree. When a large volume bulk write is performed that uses the write batch with the optimization, the LSM tree key range is split into non-overlapping logical ranges of keys using this Logical Range ID, and a different range is assigned for each individual write batch. Then, pages written by the write batch assign page clustering keys within the assigned Logical Range ID (that is, it will append new pages within that range).

Figure 4A:
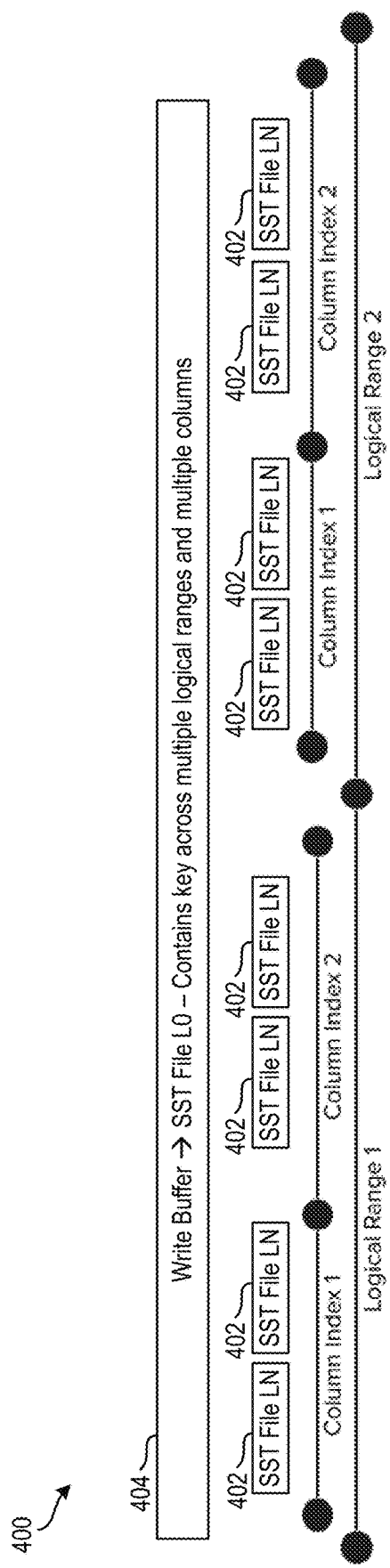
FIGS. 4A and 4B depict a statically sorted table files according to one or more embodiments described herein.

FIG. 4A shows the logical ranges (e.g., logical range 1, logical range 2), data pages written into SST files in Level N (LN) (e.g., SST File LN 402) with the write batch optimization and clustered using the column index as clustering key, and also an overlapping SST File in L0 (SST file L0 404) written through the normal write path (e.g., as shown in FIG. 3A). The SST file L0 404 contains keys across multiple logical ranges and multiple columns.

Figure 4B:
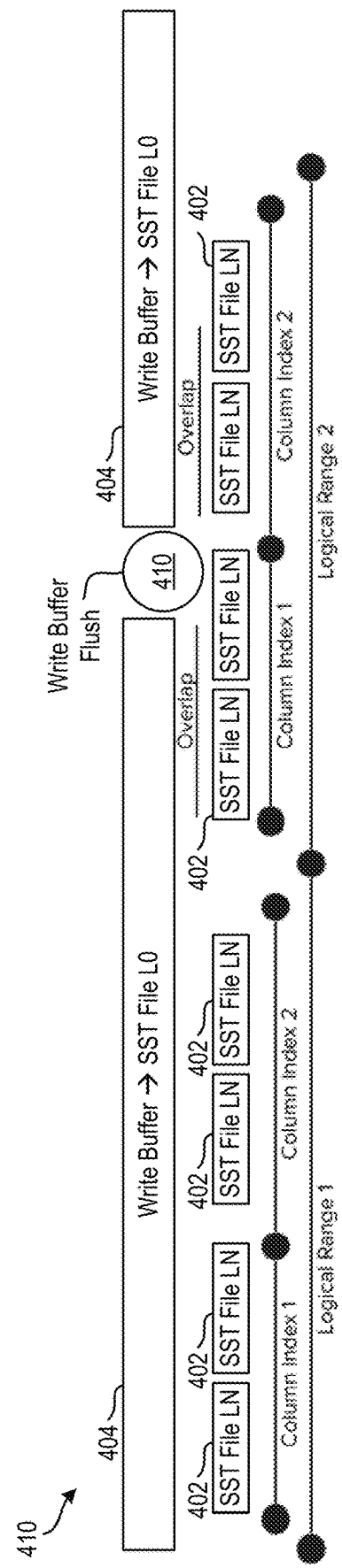

There is however one difference: after a write through a normal write path that goes into a write buffer that overlaps gets flushed (e.g., write buffer flush 410) into an SST File on Level 0, logical range ID is incremented (either synchronously or asynchronously), in order to avoid the situation where subsequent data page writes into either write path overlap anymore with the range of keys in any of the previously ingested SST files, both optimized and non-optimized. This approach, as shown in FIG. 4B, still preserves any clustering of keys within each of the logical range, and would still maintain both the benefit of the write batch optimization, and any benefits of the clustering to reads and caching.

Figure 5:
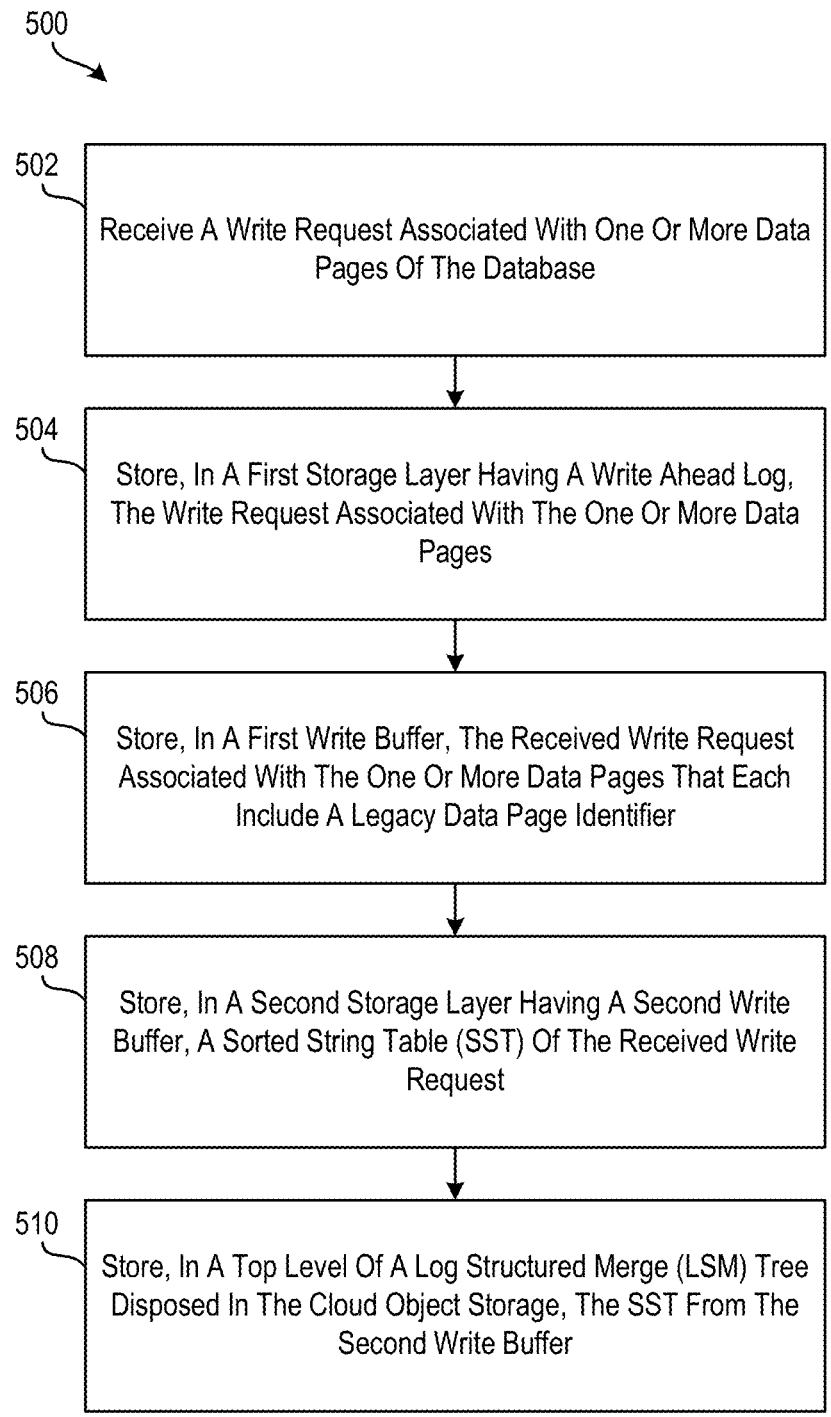
FIG. 5 depicts method for storing data pages of a database in a cloud object storage according to one or more embodiments described herein.

FIG. 5 depicts a flow diagram of a method 500 for storing data pages of a database in a cloud object storage according to one or more embodiments described herein. The method 500 can be performed by any suitable system or device as described herein, such as the computing environment 100, the storage engine 210, and/or the like, including combinations and/or multiples thereof.

At block 502, the storage engine 210 receive a write request (e.g., write page 312) associated with one or more data pages of the database (e.g., the database application 202). At block 504, the storage engine 210 stores, in a first storage layer having a write ahead log (e.g., the WAL buffer 354), the write request associated with one or more data pages. At block 506, the storage engine 210 stores in a first write buffer (e.g., the write buffer 334) the received write request associated with the one or more data pages that each include a legacy data page identifier. At block 508, the storage engine 210 stores in a second storage layer having a second write buffer (e.g., the SST file L0 342) a sorted string table (SST) of the received write request. At block 510, the storage engine 210 stores, in a top level of a log structured merge (LSM) tree (e.g., the LSM tree 362) disposed in the cloud object storage (e.g., the cloud object storage 360), the SST from the second write buffer.

Additional processes also may be included, and it should be understood that the process depicted in FIG. 5 represents an illustration, and that other processes may be added or existing processes may be removed, modified, or rearranged without departing from the scope of the present disclosure.

Figure 6:
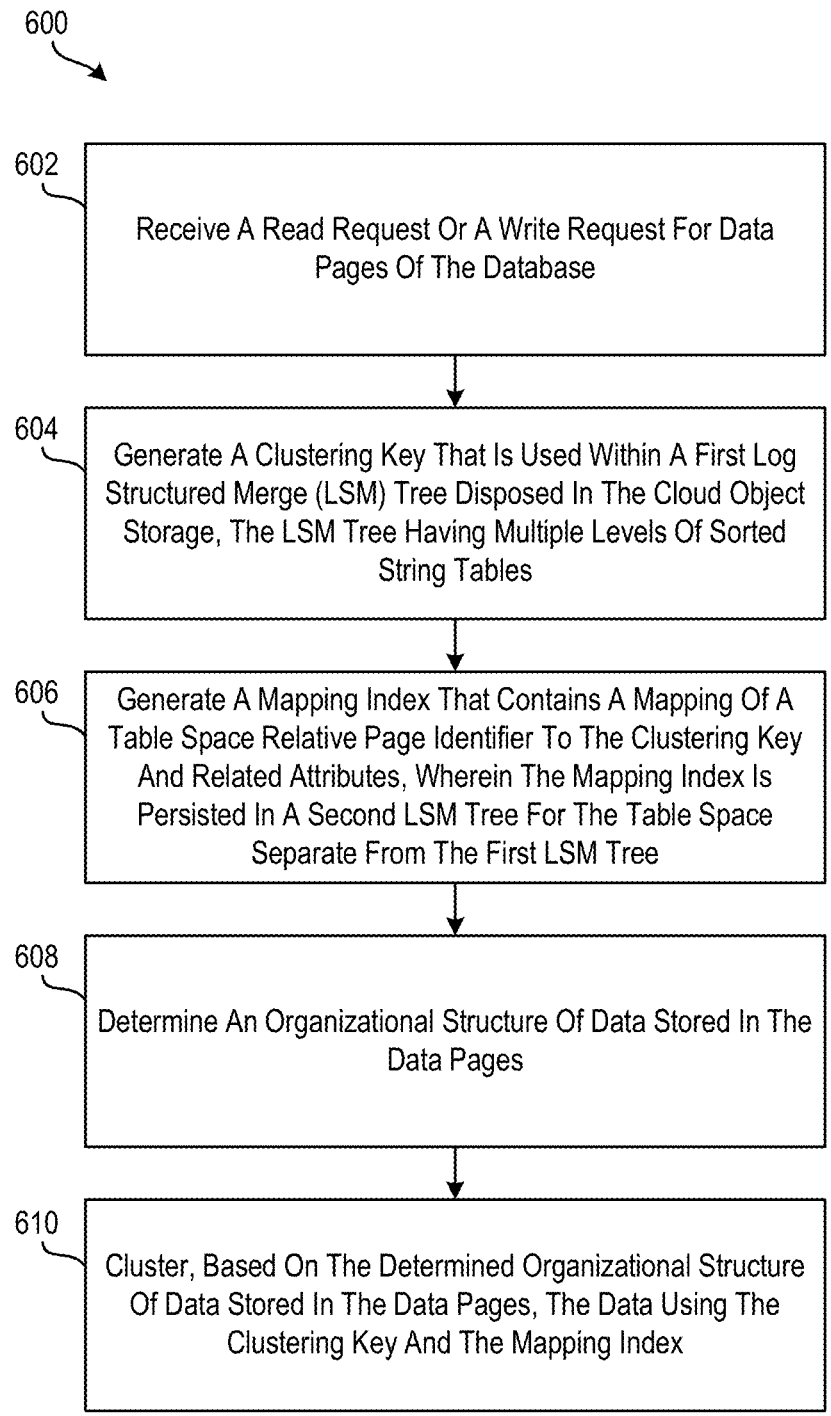
FIG. 6 depicts a flow diagram of a method for clustering data according to one or more embodiments as described herein.

FIG. 6 depicts a flow diagram of a method 600 for clustering data according to one or more embodiments as described herein. The method 600 can be performed by any suitable system or device as described herein, such as the computing environment 100, the storage engine 210, and/or the like, including combinations and/or multiples thereof.

The method 600 starts at block 602, where the storage engine 210 receives a read request or a write request for data pages of the database. At block 604, the storage engine 210 generates a clustering key that is used within the LSM tree 362 (e.g., a first LSM tree) disposed in the cloud object storage 360, the LSM tree having multiple levels of sorted string tables as shown in FIGS. 3A-3C. At block 606, the storage engine 210 generates a mapping index that contains a mapping of a table space relative page identifier to the clustering key and related attributes. The mapping index is an LSM tree persisted in a second LSM tree for the table space. At block 604, the storage engine 210 determines an organizational structure of data stored in the data pages. The organizational structure can be, for example, a column organized data structure, a row organized data structure, a large objects (LOB) structure, a B+trees structure, and/or the like, including combinations and/or multiples thereof. At block 610, the storage engine 210 clusters, based on the determined organizational structure of data stored in the data pages, the data using the clustering key and the mapping index.

Additional processes also may be included, and it should be understood that the process depicted in FIG. 6 represents an illustration, and that other processes may be added or existing processes may be removed, modified, or rearranged without departing from the scope of the present disclosure.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for storing data pages of a database in a remote storage, the method comprising:
    receiving a write request associated with one or more data pages of the database;
    storing, in a first storage layer having a write ahead log, the write request associated with the one or more data pages;
    storing, in a first write buffer, the received write request associated with the one or more data pages that each include a legacy data page identifier;
    storing, in a second storage layer having a second write buffer, a sorted string table (SST) of the received write request; and
    storing, in a top level of a log structured merge (LSM) tree disposed in the remote storage, the SST from the second write buffer.

2. The computer-implemented method of claim 1, further comprising:
    receiving, at the second write buffer, flushed write requests from the first write buffer;
    sorting, by the second write buffer, the received write requests based on the legacy data page identifier associated with the write requests; and
    creating, by the second write buffer, the SST of the received write requests.

3. The computer-implemented method of claim 1, further comprising associating a clustering key with the one or more data pages.

4. The computer-implemented method of claim 3, further comprising generating a mapping table that maps legacy data page identifiers to the clustering key for the one or more data pages stored in the LSM tree.

5. The computer-implemented method of claim 4, further comprising storing the mapping table in a second LSM tree ordered by the legacy data page identifiers.

6. The computer-implemented method of claim 4, further comprising retrieving at least one data page using the mapping table and the legacy page identifiers.

7. The computer-implemented method of claim 1, wherein each level of the LSM tree includes SSTs that are formed by combining SSTs on an adjacent higher level.

8. The computer-implemented method of claim 7, wherein SSTs of a non-top layer of the LSM tree includes non-overlapping ranges of legacy data page identifiers.

9. The computer-implemented method of claim 1, wherein the write ahead log is stored in persistent storage and the second write buffer is stored in a cache.

10. A system comprising:
    a memory comprising computer readable instructions; and
    a processing device for executing the computer readable instructions, the computer readable instructions controlling the processing device to perform operations for storing data pages of a database in a remote storage, the operations comprising:
        receiving a write request associated with one or more data pages of the database;
        storing, in a first storage layer having a write ahead log, the write request associated with the one or more data pages;
        storing, in a first write buffer, the received write request associated with the one or more data pages that each include a legacy data page identifier;
        storing, in a second storage layer having a second write buffer, a sorted string table (SST) of the received write request; and
        storing, in a top level of a log structured merge (LSM) tree disposed in the remote storage, the SST from the second write buffer.

11. The system of claim 10, wherein the operations further comprise:
    receiving, at the second write buffer, flushed write requests from the first write buffer;
    sorting, by the second write buffer, the received write requests based on the legacy data page identifier associated with the write requests; and
    creating, by the second write buffer, the SST of the received write requests.

12. The system of claim 10, wherein the operations further comprise associating a clustering key with the one or more data pages.

13. The system of claim 12, wherein the operations further comprise generating a mapping table that maps legacy data page identifiers to the clustering key for the one or more data pages stored in the LSM tree, and storing the mapping table in a second LSM tree ordered by the legacy data page identifiers.

14. The system of claim 13, wherein the operations further comprise storing the data pages in an order defined by the clustering key.

15. The system of claim 10, wherein the operations further comprise retrieving at least one data page using a mapping table and the legacy page identifiers.

16. The system of claim 10, wherein each level of the LSM tree includes SSTs that are formed by combining SSTs on an adjacent higher level, and wherein SSTs of a non-top layer of the LSM tree include non-overlapping ranges of legacy data page identifiers.

17. A computer-implemented method for retrieving data pages of a database in a remote storage, the method comprising:
    receiving a read request for a date page of the database;
    searching a log structured merge (LSM) tree disposed in the remote storage for a sorted string table (SST) file associated with the data page of the read request;
    responsive to locating the SST file associated with the data page of the read request, storing the SST in a local cache;
    receiving a subsequent read request for the data page of the database;
    retrieving the SST file associated with the data page of the read request from the local cache without searching the LSM tree;
    determining whether the local cache is full; and
    responsive to determining that the local cache is full, selecting one or more of a plurality of SST files stored in the local cache to evict.

18. A system for storing data pages of a database in a cloud object storage, the system comprising:
    an application programing interface configured to receive read and write requests from the database, the read and write requests corresponding to one or more data pages;
    a first storage layer having a write ahead log that is configured to store received write requests associated with one or more data pages and to associate a clustering key with the one or more data pages;
    a first write buffer that is configured to store received write requests associated with the one or more data pages that each include a legacy data page identifier;

a second storage layer having a second write buffer that is configured to receive flushed write requests from the first write buffer, sort the write requests based on the legacy data page identifier associated with the write requests, and create a sorted string table (SST) of the write requests;

a log structured merge (LSM) tree disposed in the cloud object storage, the LSM tree having multiple levels of sorted string tables, wherein a top level of the LSM tree stores SSTs received from the second write buffer, and wherein each level of the LSM tree includes SSTs that are formed by combining SSTs on an adjacent higher level, such that SSTs of a non-top layer of the LSM tree includes non-overlapping ranges of legacy data page identifiers; and a mapping table mapping legacy data page identifiers to clustering keys that is stored in the LSM tree.

* * * * *